Figure 1:
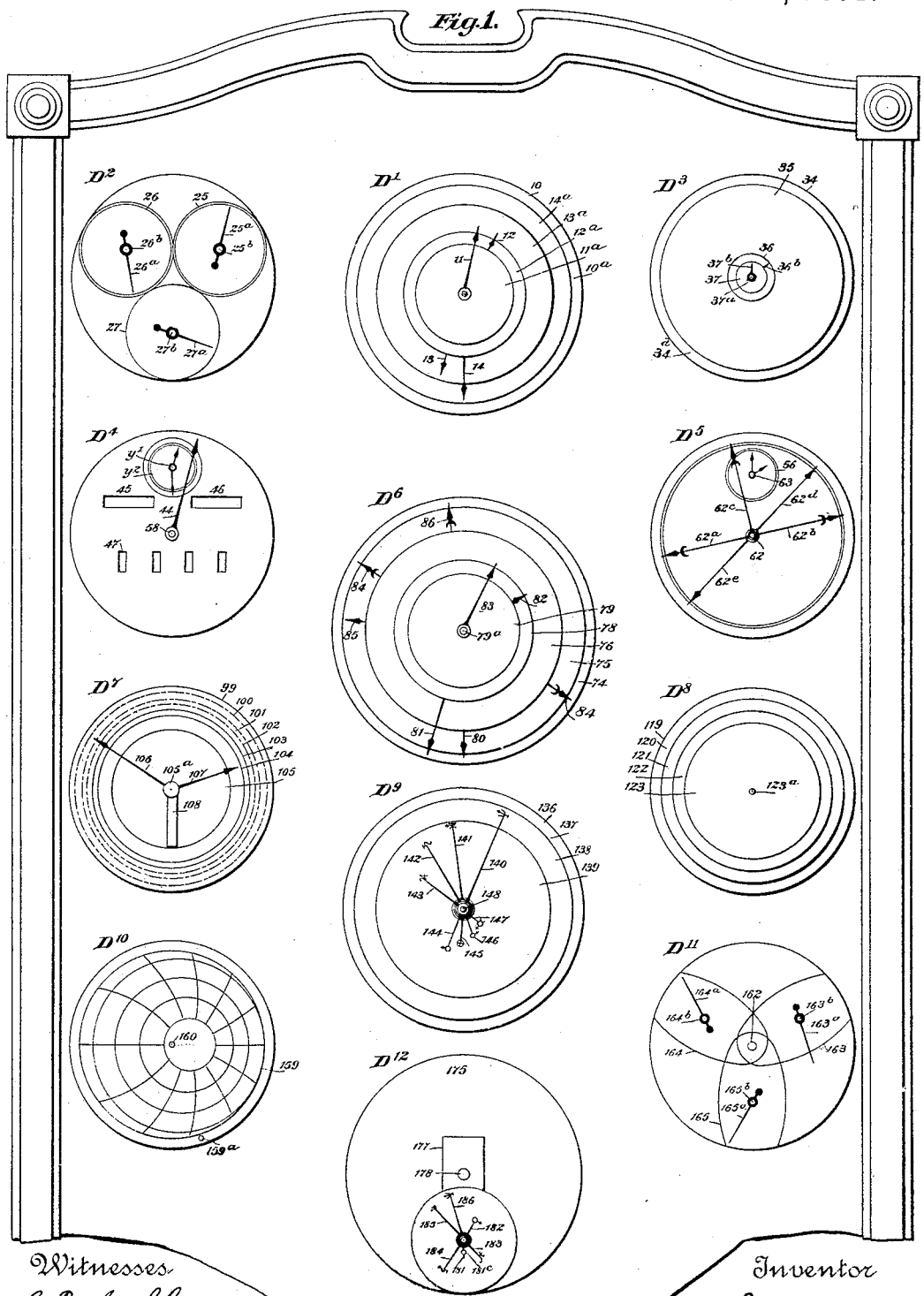

(No Model.) 11 Sheets—Sheet 3.

A. M. CORY.
ASTRONOMICAL CLOCK.

No. 463,101. Patented Nov. 10, 1891.

Witnesses
C. E. Ashley
W. S. Walker

Inventor
Abraham M. Cory
W. J. FitzGerald, Atty

THE NORRIS PETERS CO., PHOTO-LITHO., WASHINGTON, D. C.

(No Model.)  A. M. CORY.  11 Sheets—Sheet 4.
ASTRONOMICAL CLOCK.

No. 463,101.  Patented Nov. 10, 1891.

Witnesses
C. E. Ashley
W. S. Walker

Inventor
Abraham M. Cory.
W. T. Fitzgerald, Atty (No Model.)  11 Sheets—Sheet 5.
A. M. CORY.
ASTRONOMICAL CLOCK.
No. 463,101.  Patented Nov. 10, 1891.
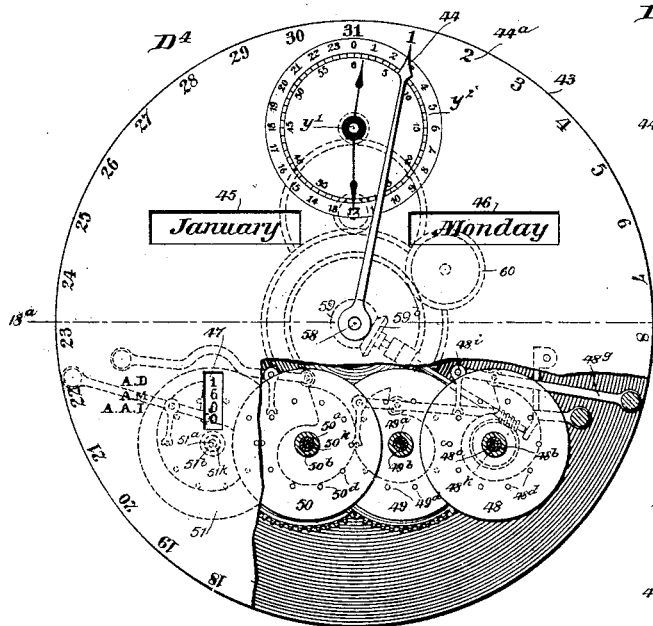
Fig. 6.
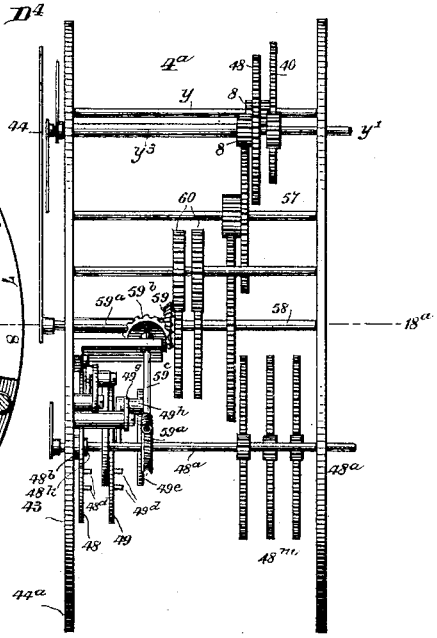
Fig. 18.
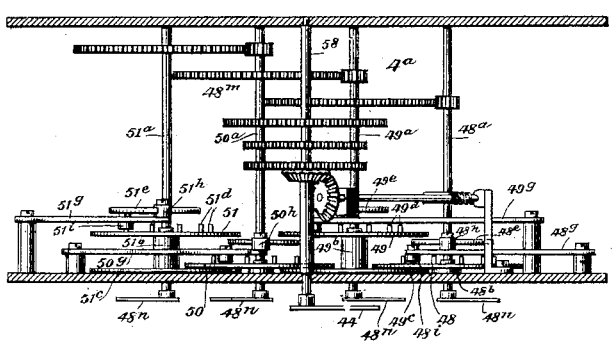
Fig. 18ᵃ.
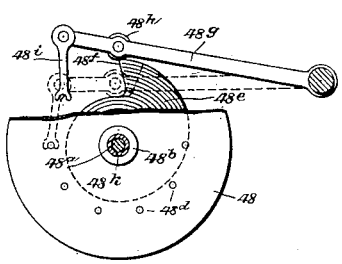
Fig. 27.
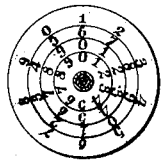
Fig. 6ᵃ.
Witnesses
C. E. Ashley
W. L. Walker
Inventor
Abraham M. Cory
W. T. Fitzgerald, Atty.
THE NORRIS PETERS CO., PHOTO-LITHO., WASHINGTON, D. C.

(No Model.) 11 Sheets—Sheet 6.

A. M. CORY.
ASTRONOMICAL CLOCK.

No. 463,101. Patented Nov. 10, 1891.

Witnesses
C. E. Ashley
W. S. Walker

Inventor
Abraham M. Cory,
W. T. Fitzgerald, Atty

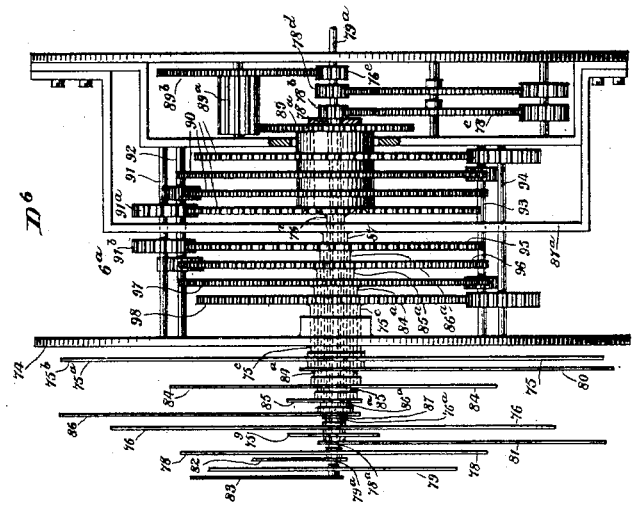

(No Model.) 11 Sheets—Sheet 8.
A. M. CORY.
ASTRONOMICAL CLOCK.
No. 463,101. Patented Nov. 10, 1891.
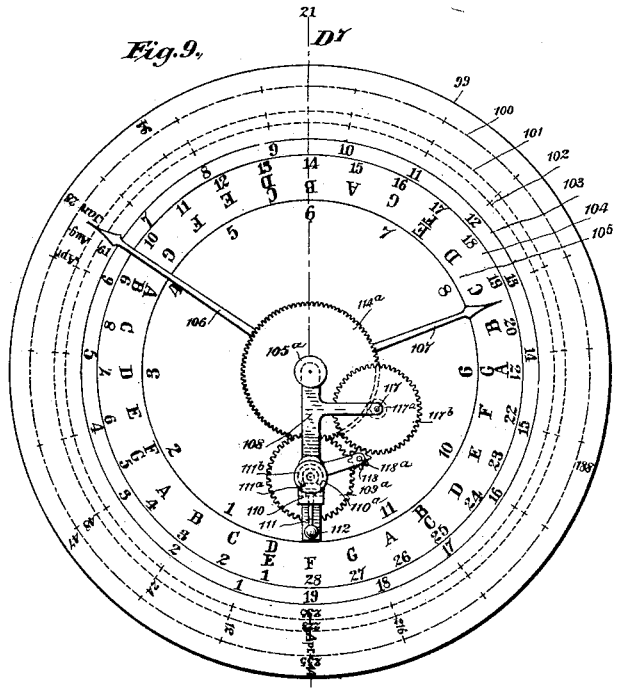
Witnesses
C. E. Ashley
W. S. Walker
Inventor
Abraham M. Cory
W. T. Fitzgerald, Atty.

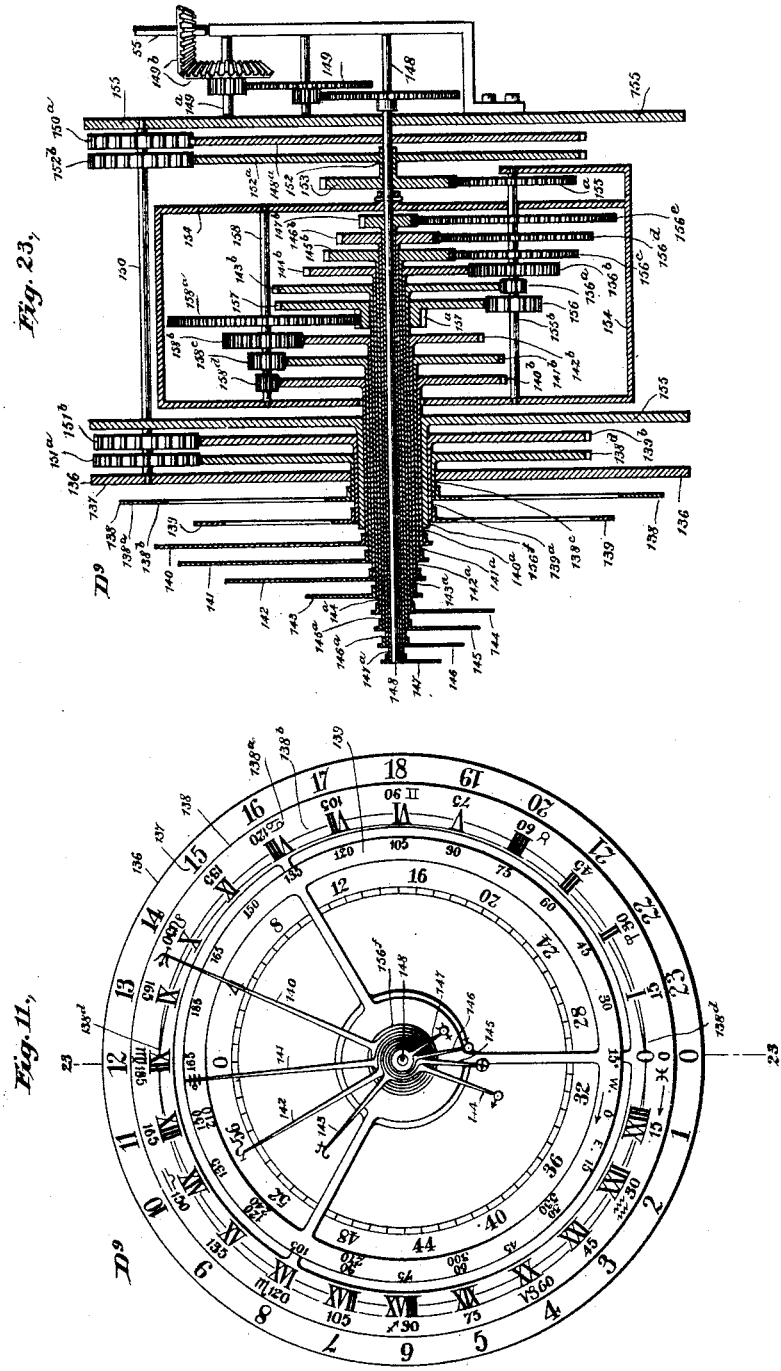

(No Model.)  11 Sheets—Sheet 10.

A. M. CORY.
ASTRONOMICAL CLOCK.

No. 463,101. Patented Nov. 10, 1891.

Witnesses
C. E. Ashley
W. S. Walker

Inventor
Abraham M. Cory
W. F. Fitzgerald, Atty.

(No Model.)  
11 Sheets—Sheet 11.
A. M. CORY.
ASTRONOMICAL CLOCK.
No. 463,101. Patented Nov. 10, 1891.
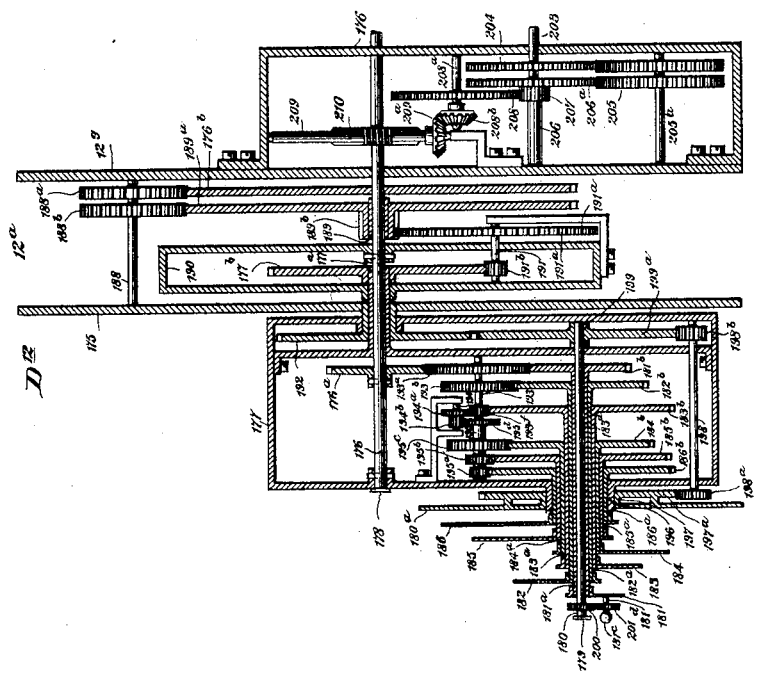
Witnesses  
C. E. Ashley  
W. S. Walker
Inventor  
Abraham M. Cory.

UNITED STATES PATENT OFFICE.

ABRAHAM M. CORY, OF NEW PROVIDENCE, NEW JERSEY.

ASTRONOMICAL CLOCK.

SPECIFICATION forming part of Letters Patent No. 463,101, dated November 10, 1891.

Application filed February 11, 1891. Serial No. 381,048. (No model.)

*To all whom it may concern:*

Be it known that I, ABRAHAM M. CORY, of New Providence, in the county of Union and State of New Jersey, have invented a new and Improved Astronomical Clock, of which the following is a full, clear, and exact description.

The object of this invention is to produce a clock which, while indicating terrestrial time and longitude and other terrestrial and lunar phenomena, will also show the positions, relations one to another, movements, and periodic times of the solar and sidereal systems, and is particularly intended to illustrate the principles of physical astronomy.

To these ends the invention consists in a series of dials and movements constructed and arranged as will be hereinafter more specifically set forth, all actuated from a common center, as hereinafter to be described; and the invention also consists in various details of construction and combination of parts, all as hereinafter specifically set forth and claimed.

The invention, as carried out in the clock now to be described, consists of a clock provided with twelve indicating-dials, the term "dial" being used in the broad sense of a device indicating to the eye the information to be conveyed.

Dial No. 1 is intended to show universal mean solar and sidereal time; dial No. 2, to show the difference between mean solar and sidereal time, which is the right ascension of the sun; dial No. 3, to show the diurnal motion and right ascension of the meridian stars in both hemispheres and their meridian culmination at all times of the year, also their declination. Dial No. 4 is a magnified calendar. Dial No. 5 is intended to show the motions and times of the moon and the times of the tides; dial No. 6, to show the universal mean solar and sidereal times, the right ascension of the sun and moon, and the movements and positions of the moon's nodes and apsides, thus indicating the eclipses; dial No. 7, to show the elements of the lunar and solar cycles. Dial No. 8 indicates the precession of the equinoxes. Dial No. 9 illustrates the diurnal and periodical revolutions of the planets. Dial No. 10 illustrates the variations in time caused by the obliquity of the earth's axis for all latitudes and longitudes. Dial No. 11 shows the perihelion and aphelion of certain known comets, and dial No. 12 indicates and illustrates the precession of the equinoxes and its causes. These dials are each provided with an independent mechanism, all of which are driven from one main clock-movement, with which they are connected by suitable gearing, or one of the dials may be on the main movement, the other movements being driven therefrom.

I will separately describe in detail the dials, their movements, and the connecting-gearing.

Reference is to be had to the accompanying drawings, forming a part of this specification, in which similar figures and letters of reference indicate corresponding parts in all the views.

Figure 2:
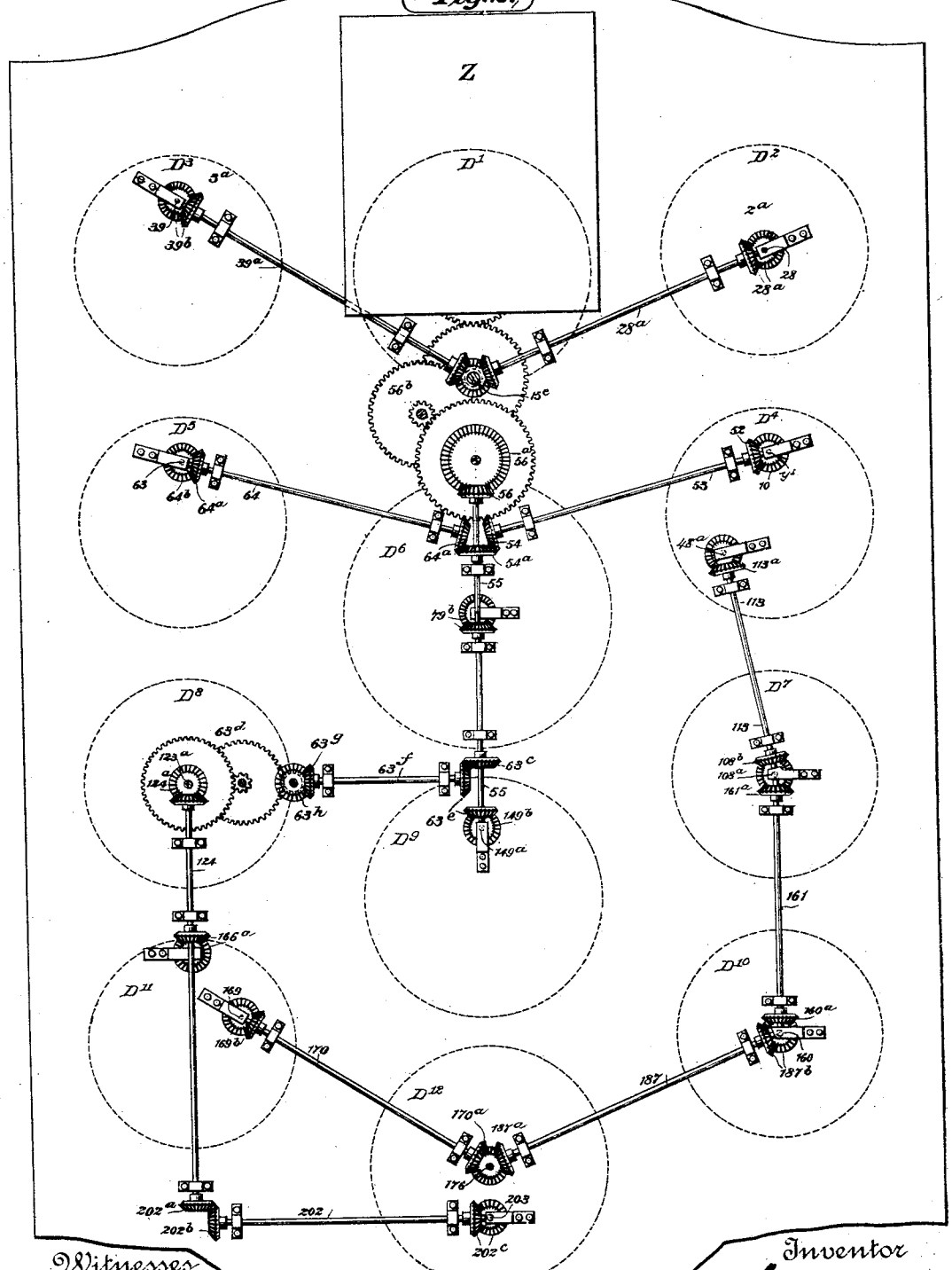
Figure 15:
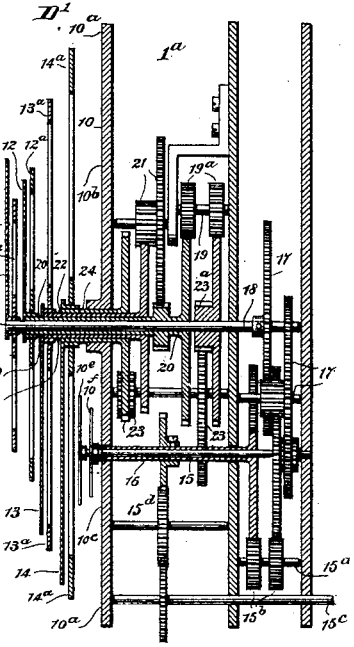
Figure 16:
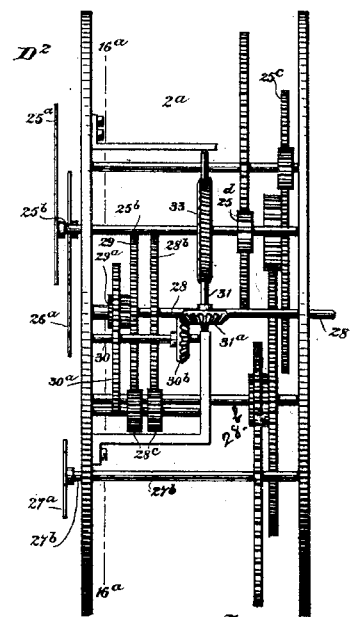
Figure 22:
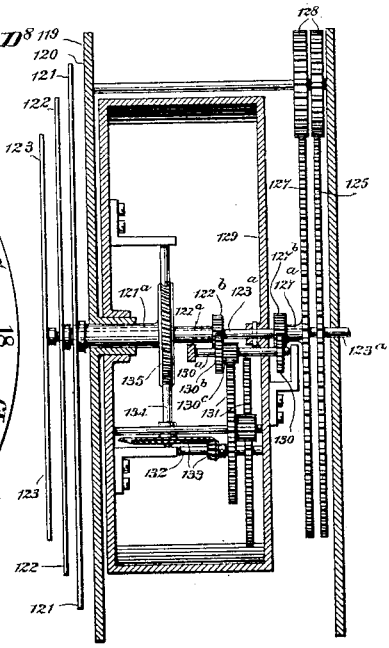
Figure 19:
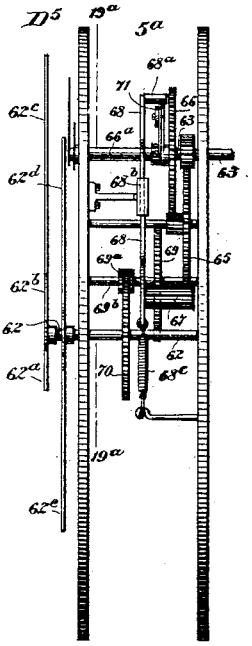
Figure 19A:
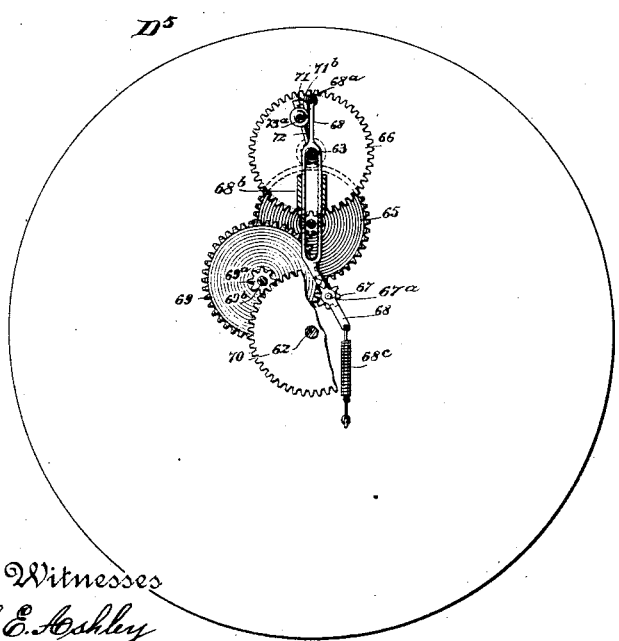
Figure 24:
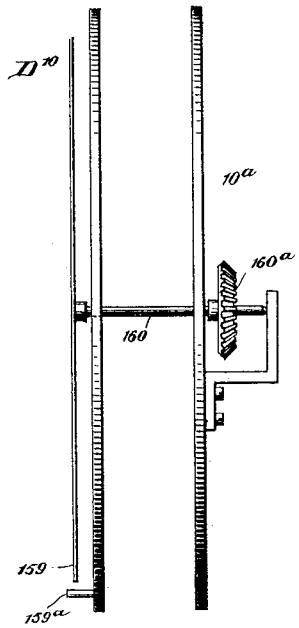
Figure 25:
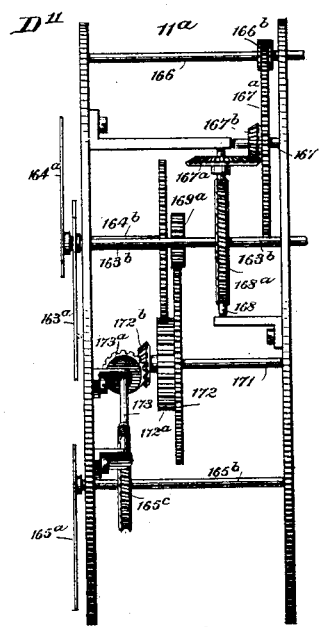

Figure 1 is a face view of the clock, showing the positions of the various dials, the lower portion of the clock being broken away. Fig. 2 is a similar view of the rear of the clock, showing the connections of the movements with each other and with the main actuating-movement. Figs. 3 to 14, inclusive, are face views of the various dials, the dial-face in Fig. 6 being partly broken away and the arbor and sleeves in Fig. 10 being in section and the supporting-arms of the rings broken away. Fig. 6$^a$ shows a modification in the arrangement of the calendar-dials in Fig. 6. Fig. 15 is a vertical central sectional side elevation, on the line 15 15 in Fig. 3, of the movement for dial No. 1. In referring to the dials I designate dial No. 1 D', dial No. 2 as D$^2$, and so on through the entire number. Figs. 16 to 20, inclusive, are side elevations of the movements for dials Nos. 2 to 6, inclusive. Fig. 16$^a$ is a sectional face view, on the line 16$^a$ 16$^a$ in Fig. 16, of the movement for dial No. 2. Fig. 18$^a$ is a sectional plan view, on the line 18$^a$ 18$^a$ in Fig. 18, of the movement for dial No. 4. Fig. 19$^a$ is a sectional face view, on the line 19$^a$ 19$^a$ in Fig. 19, of the movement for dial No. 2. Figs. 21 to 23, inclusive, are central sectional side elevations of the movements for dials 7 to 9, inclusive. Figs. 24 and 25 are side elevations of the movements for dials Nos. 10 and 11, respectively. Fig. 26 is mainly a vertical central sectional side elevation, on the line 26 26 of Fig. 14, of the movement for dial No. 12. Fig.

Figure 28:
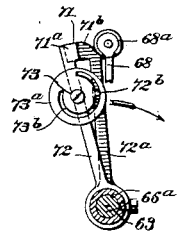

27 is a detail of the mechanism in the movement of dial No. 4, Fig. 18; and Fig. 28 is a detail of the mechanism in the movement of dial No. 5, Fig. 19.

In Fig. 1 is shown the face of the clock with the various dials from 1 to 12, inclusive, produced thereon, and showing also the various hands and indicators as arranged to move over said dials, all as will be hereinafter more particularly described, in connection with said dials.

In Fig. 2 is shown a rear view of the clock and the connections of the various dial-movements one with the other and with the main actuating-movement, as will be hereinafter particularly described in connection with the description of the said dial-movements.

Figure 3:
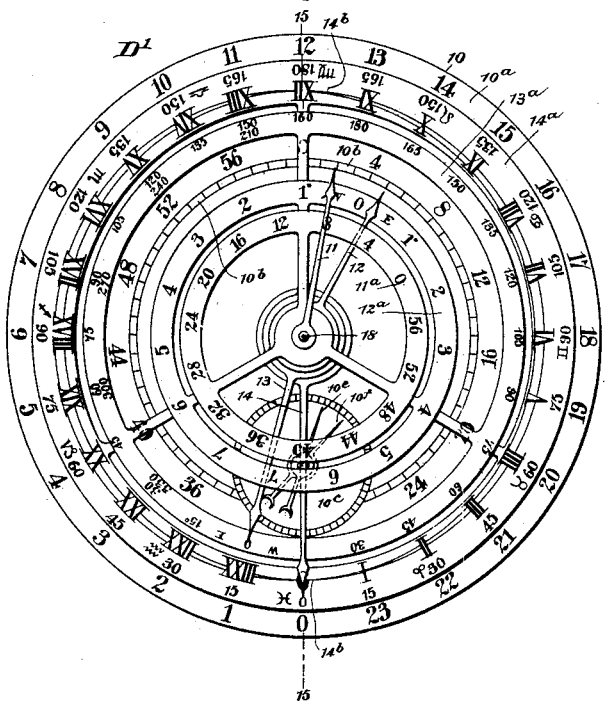

Dial No. 1, Fig. 3, consists of a face 10 in an annular space or ring on the outer margin of which hours are indicated, as at $10^a$; in an annular space at $10^b$ minutes are indicated, and on the face near the center a circle $10^c$ is produced on which seconds are marked. Over this circle revolve the hands $10^e$ and $10^f$, indicating one sidereal time and the other mean solar time. In front of the face 10 revolve the hands 11, 12, 13, and 14, and with said hands are carried the rings $11^a$ $12^a$ $13^a$ and the double ring $14^a$, the hands being carried by sleeves in the usual manner, and the rings being carried by and adjustable on the sleeves which carry the respective hands. All the rings are graduated in time and longitude, and the ring $14^a$ has produced thereon divisions of time and longitude and the signs of the zodiac representing the constellations. The ring and hand 11 $11^a$ are designed to indicate minutes of sidereal time, and the ring and hand 12 $12^a$ minutes of mean solar time on the graduation $10^b$. The ring and hand 13 $13^a$ are designed to indicate hours of universal solar time, and the hand 14 and ring $14^a$ indicate universal sidereal hours on the graduation $10^a$. On the ring $14^a$ at $14^b$ the equinoctial points are shown. By omitting the rings the hands alone will indicate for any special fixed location. The numbers on the rings indicate universal sidereal time for every locality.

The hands of dial No. 1 are actuated by the movement $1^a$ shown in Fig. 15, the shaft 15 of which is driven in sidereal time to have one revolution a minute by the shaft $15^a$ and differential gearing $15^b$ from the sleeve 16 on said shaft 15, which sleeve is driven in solar time to have one revolution per minute by the gear-wheels $15^d$ and shaft $15^c$, which shaft $15^c$ is driven in solar time by direct connection with the second arbor or post of a suitable clock-work Z of any ordinary construction, the said post being indicated at $15^e$ in Fig. 2. The shaft 15 carries the second-hand $10^e$ for sidereal time and the sleeve 16 carries the other second-hand $10^f$ for solar time. From the shaft 15, through the shaft and gearing 17, motion is communicated to the main arbor 18, carrying the minute-hand 11, indicating sidereal time, from which arbor 18, through the counter-shaft 19 and differential gearing $19^a$, motion is communicated in solar time to the sleeve 20, carrying the hand 12. From the sleeve 20, through the gearing 21, motion is communicated to the sleeve 22, carrying the hand 13 in solar time, and from the shaft 18, through the pinion $23^a$ and gearing 23, motion is communicated to the sleeve 24, carrying the hand 14 in sidereal time, the gearing being proportioned to give the proper relative speed to the hands.

Figure 4:
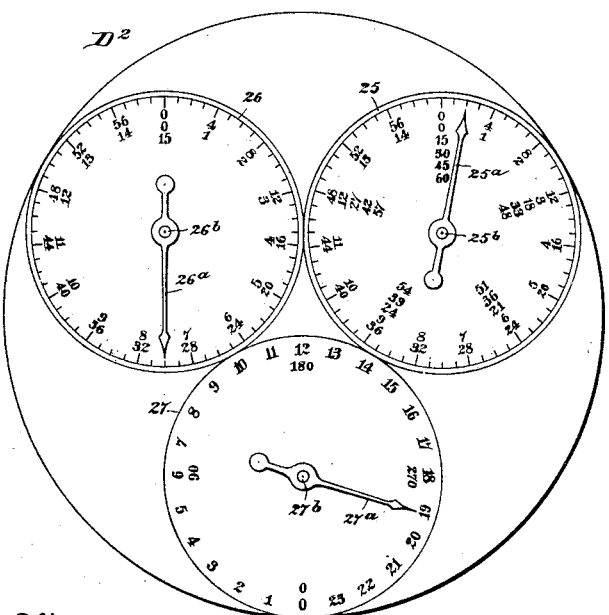

Dial No. 2, Fig. 4, consists of a face-plate, on which are produced three circles 25, 26, and 27, all graduated to indicate divisions of time and longitude. Over the circle 25 revolves a hand $25^a$, carried by an arbor $25^b$, which makes about fourteen hundred and forty revolutions in a day, indicating seconds. Over the circle 26 revolves a hand $26^a$ on an arbor $26^b$, which makes twenty-four revolutions a day, indicating minutes; and over the circle 27 revolves a hand $27^a$ on an arbor $27^b$, which makes one revolution in a day and indicating hours, and all showing right ascension of the sun. These arbors are driven by the mechanism $2^a$, (shown in Figs. 16 and $16^a$,) which consists of a main shaft 28, driven from the shaft $15^c$ of the actuating-movement Z by the shaft and gearing $28^a$, (see Fig. 2,) which shaft $15^c$ is timed for solar time. On the shaft 28 is fixed a pinion $29^a$, which meshes with a gear $30^a$ on a shaft 30, which carries a bevel-gear $30^b$, which meshes with a bevel-gear $31^a$ on a shaft 31, provided with a worm 32, which in turn meshes with a worm-wheel 33 on the arbor $25^b$, carrying the second-hand $25^a$. From a pinion $25^d$ on the arbor $25^b$, by an ordinary clock-train $25^c$, motion is communicated to the minute and hour hands $26^a$ and $27^a$, the gain of sidereal over solar time being indicated on the circles 25, 26, and 27 by the hands $25^a$, $26^a$, and $27^a$, which show the gain of sidereal time or the mean right ascension of the sun. In case the shaft $15^c$ is timed in sidereal time, and consequently also the shaft 28, the pinion $29^a$ will be made integral with a gear 29 and mounted loosely on the shaft 28, and through the differential gearing $28^c$ and gear $28^b$, fast on shaft 28, the said movement will be timed for solar time.

Figure 5:
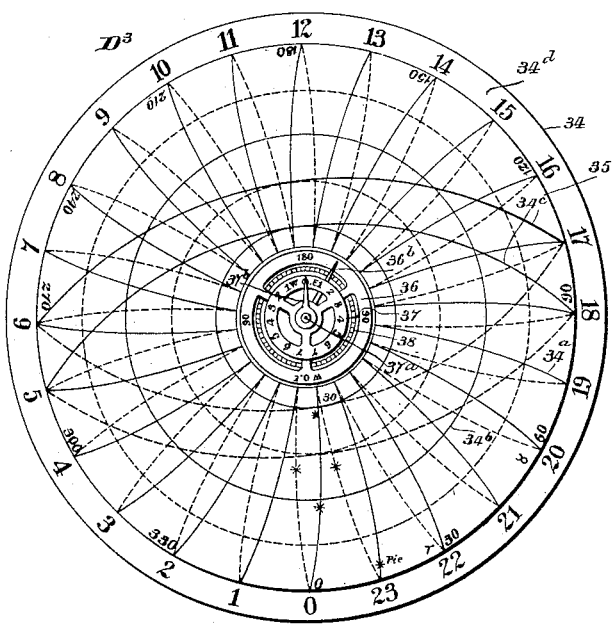

Dial No. 3, Fig. 5, consists of a face 34, over which revolves a disk 35 on a sleeve $35^a$. On the uncovered annular rim $34^d$ of the face 34 are marked the hours from 1 to 24. On the disk 35 are produced the lines $34^a$ $34^b$ of celestial latitude and longitude, those for the northern hemisphere being shown in full lines and those for the southern hemisphere in dotted lines. On the disk 35 are also shown in their position in the heavens certain of the fixed stars. On the disk are also produced the lines $34^c$, showing the position of the Milky Way. Centrally of the disk 35 are mounted the revoluble rings 36 and 37, as hereinafter set forth. On a sleeve $36^a$ on an arbor $37^a$ (see Fig. 17) is mounted the ring 36 and an adjustable hand $36^b$, on which ring are marked the degrees of longitude. The ring 37 is mounted on the arbor $37^a$, which also carries an adjustable hand $37^b$, on which ring are marked subdivisions of longitude, and on the annular space 38 on the disk 35, between the rings 36 and 37, are marked minute divisions of time. The shaft 39 of the movement $3^a$ is driven from the shaft $15^e$ of the actuating-movement Z by the shaft $39^a$ and gearing $39^b$ to make one revolution per minute, and the arbor $37^a$ is driven from the gear $39^c$ on shaft 39 by the intermediate reducing-gear 40 to revolve once an hour, from which arbor $37^a$ the sleeve $36^a$ is driven by the reducing-gear 41 once a day. The sleeve $35^a$ is revolved once in a sidereal day by means of the differential gear 42 and wheels $42^a$ on said arbors. By this dial the gain of a sidereal time over solar time of one day per year is shown, as also the diurnal motion of the fixed stars with their right ascension and north-polar distance.

Dial No. 4, Fig. 6, is a calendar-dial, and consists of a plain face 43, provided with slots 45 and 46, and an indicating-hand 44 for the days of the month, and will be provided with any of the well-known mechanisms for indicating the month and day of the week at the slots 45 and 46, the days of the month being produced on the rim of the dial, as shown at $44^a$. In the lower part of the face 43 are formed a series of slots similar to the slot 47 on the left-hand side of the dial, and at the rear of the face a series of indicating-disks 48, 49, 50, and 51, having produced on them a series of numbers, are arranged in such manner that by reading horizontally across the face, the aligning numbers appearing at the slots 47, certain dates will be shown. The numbers are arranged in concentric circles running from 0 to 9 and are arranged radially, so that the date it is desired to indicate will be shown as stated. For instance, the upper horizontal line of numbers indicates A. D. 1887, the second line A. M. 6600, the third line the year of American Independence, &c. Any desired epoch may be thus indicated and any number of concentric series of numbers may be used. The different concentric lines of numbers may be produced on independent disks overlying one another, as shown in Fig. $6^a$, so that the same may be set at pleasure to indicate the desired period or epoch. The disks are driven by the mechanism $4^a$, Figs. 18 and $18^a$, now to be described, so that the disk 48 will revolve once in ten years, the disk 49 once in one hundred years, the disk 50 once in one thousand years, and the disk 51 once in ten thousand years. The disk 48 is mounted on a sleeve $48^b$, turning a hollow post $48^k$, through which extends an arbor $48^a$. The disk 49 is mounted on a sleeve $49^b$, turning on a hollow post, in which is journaled an arbor $49^a$. The disk 50 is mounted on a sleeve $50^b$ on a hollow post, in which is journaled an arbor $50^a$, and the disk 51 on a sleeve $51^b$ on a hollow post supporting an arbor $51^a$. The disk 48 is more fully shown in Fig. 27. This disk is shown attached on the sleeve $48^b$, mounted on the hollow post $48^k$. The disk 48 has arranged on its rear side in a circle near its periphery a series of ten pins $48^d$. On the arbor $48^a$, journaled at one end in the hollow post $48^k$, is mounted a cam-disk $48^e$, the scroll of which increases, so that the difference at $48^f$ will give a drop slightly less than the distance between the pins $48^d$. A lever $48^g$, suitably fulcrumed to the frame, extends at the side of the wheel $48^e$ and has studded to it a roller $48^h$, which travels on the periphery of the cam-disk $48^e$. A pendent pawl $48^i$ is pivoted to the lever $48^g$, which pawl is adapted to engage by its forked lower end the pins $48^d$ in succession. By this mechanism as the arbor $48^a$ revolves the roller $48^h$ travels up on the cam-wheel until it reaches the drop $48^f$, when the lever falls, and with it the pawl $48^i$, which pawl, by engaging one of the pins $48^d$, revolves the sleeve $48^b$ and disk 48 one-tenth of a revolution for every revolution of the arbor $48^a$; but this movement may be otherwise effected. The other disks are rotated from their arbors in the same manner. As shown arranged, the disks 49 and 51 stand considerably to the rear of the face 43, and to insure the correct reading of the numbers at the slots 47 a second disk $49^c$ and $51^c$ is placed on the respective sleeves $49^b$ and $51^b$, on which latter disks the numbers are produced. In order to give the above-mentioned arbors the proper number of revolutions, the minute-arbor $y'$ of a common clock-movement $y$ may be connected by the bevel-gear 52 with a shaft 53, connected by the gear-wheels 54 and $54^a$ with a shaft 55, connected by a bevel-gear 56 and bevel-gear $56^a$ and reducing-gear $56^b$ with the second arbor $15^e$ of the actuating clock-work Z. (See Fig. 2.) The clock-work $y$ may indicate time, if desired, on the face 43 at $y^2$. From the hour arbor or sleeve $y^3$ a shaft 57 is driven to revolve once in six days, from which shaft 57 the shaft 58 is driven to revolve once in thirty-one days. This shaft carries the hand 44, the said shafts being connected by suitable gearing, as shown. From the shaft 58 the bevel-wheel 59, mounted on a sleeve $59^a$ on the said shaft 58, is driven by the differential gear 60 to revolve once in a month, which month represents the forty-eighth part of four years. The wheel 59 meshes with a similar bevel-wheel $59^b$ on a worm-shaft $59^c$, the worm of which engages a worm-wheel $59^d$ on the arbor $48^a$, by which train the arbor $48^a$ is driven to revolve once in a year and one-fourth of a day, so that said arbor $48^a$ will be revolved to correspond with four calendar years in four years. From this arbor $48^a$, by suitable gearing $48^m$, the arbors $49^a$, $50^a$, and $51^a$ are driven to revolve, respectively, in ten, one hundred, and one thousand years. The arbors $48^a$, $49^a$, $50^a$, and $51^a$ are each provided with a hand $48^n$, which registers with the drop of the respective cam $49^c$ to indicate the position of the drops on the respective cams.

Figure 7:
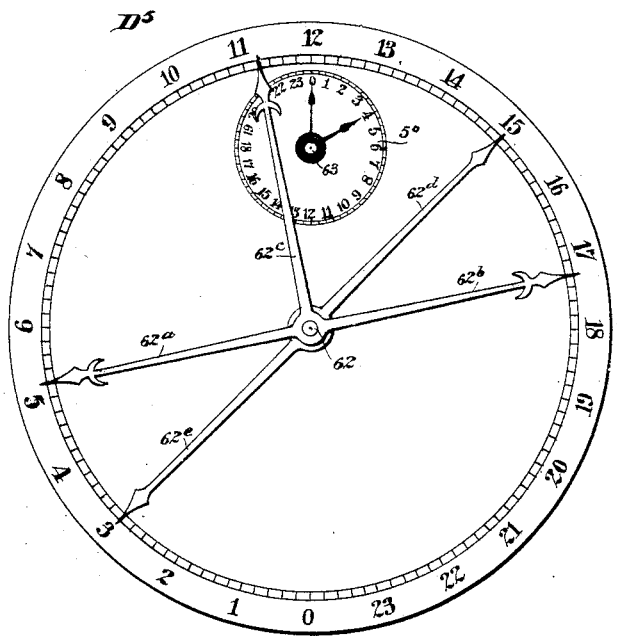

Dial No. 5, Fig. 7, is intended to indicate the mean times of the moon's rising, southing, and setting, and the times of the tides for the current date, and consists of a plain dial on which, in a circular line near the periphery, are produced the numbers from 0 to 23, indicating the hours of the day, the spaces between which numbers are subdivided to indicate the fractional parts of the hours. An arbor 62 is journaled centrally of the dial, which arbor carries five hands—viz., $62^a$, $62^b$, $62^c$, $62^d$, and $62^e$—three of which, $62^a$, $62^b$, and $62^c$, indicating, respectively, the times of the moon's rising, setting, and southing, are held to the arbor for synchronous movement. The hands $62^d$ and $62^e$, indicating, respectively, the semi-diurnal times of high water, are independently held on the arbor 62 for synchronous movement, and these hands $62^d$ and $62^e$ are also adjustably held to the arbor to permit of their being adjusted to the proper establishment of port. The arbor 62 and hands carried thereby are moved once a day, by a mechanism hereinafter described, through a distance equal to the daily change of the moon's position, so that the times are indicated for the twenty-four hours following the change of position.

Above the dial 5 (see Fig. 19) is located a clock-work mechanism, the minute-arbor 63 of which is driven from the gear-wheel $54^a$ on the before-mentioned shaft 55 by the shaft 64 and gear-wheels $64^a$ and $64^b$ at the same speed. From the arbor 63, by the intermediate gear 65, the gear 66 on a sleeve $66^a$ on the arbor 63 is revolved once in twenty-four hours. Below the gear 65 is supported on a pin $67^a$, fixed in a rod 68 a pinion 67, which pinion is normally out of mesh with the gear 65. With the pinion 67 meshes a gear 69 integral with a pinion $69^a$ on a shaft $69^b$. With the pinion $69^a$ meshes the gear 70 on the arbor 62, by which system of gearing the said arbor is intermediately revolved once in twenty-four hours a distance equal to the change of position of the moon, when the pinion 67 is brought into mesh with the gear 65, to accomplish which intermittent movement the rod 68 is moved longitudinally against the tension of a spring $68^c$ and held during the space of about forty-nine minutes, thereby holding the pinion 67 in mesh with the gear 65 by the mechanism now to be described. The rod 68 extends above the arbor 63 to the periphery of the gear 66, being slotted to receive said arbor, by which and a sleeve $68^b$ it is guided. The rod 69 carries a roller $68^a$, which is engaged by a segmental track 71, which may be fixed to the gear 66, and is of such length that it will hold the rod 68 raised for about forty-nine minutes. Preferably, to provide for an accurate adjustment of the length of the track 71, it is made in two overlapping sections $71^a$ and $71^b$, supported by arms 72 and $72^a$, of which the arm 72 is fast on the sleeve $66^a$ and the arm $72^a$ loose on said sleeve. A screw 73, engaging the arm 72, carries a plate $73^a$, provided with an eccentric-slot $73^b$, and a pin $72^b$ in the arm $72^a$ engages said slot, so that by turning the plate $73^a$ the arms will be adjusted toward or from each other, thereby adjusting the length of the track 71. The plate is held in position by tightening the screw 73. By this movement of the rod 68 the pinion 67 is engaged with the constantly-moving gear 65, thereby rotating the arbor 62 and moving the hands $62^a$, $62^b$, $62^c$, $62^d$, and $62^e$ over the dial 5 a distance equal to the change of position of the moon for twenty-four hours. The arbor 63 and the sleeve $66^a$ carry hands which indicate on a small dial $5^b$, and a series of indicators may be mounted thereon similar to those shown and described in relation to dial 1. It is evident that the track 71 might be on the rod 68 and a pin on the gear 66 be made to engage beneath the track 71 to lift the rod.

Dial No. 6, Fig. 8, consists of a series of rings revolving over a fixed face and hands revolving in connection with the rings. This dial is an extension of dial No. 1, and is designed to indicate, in addition to what is shown by dial No. 1, the position or right ascension of the moon, including the changes and lunar periods, the line of the moon's nodes and apsides, and also the times of the occurrence of eclipses, the rings and hands for these purposes making periodic and diurnal revolutions. On the fixed face 74 at the periphery are numbers from 1 to 24, indicating the hours of the day. Within these is a revoluble double ring 75, on the outer one $75^a$ of which are produced the signs of the zodiac, and on the inner one $75^b$ divisions indicating right ascension and longitude, and showing also at $75^h$ the equinoxes, the equator, and ecliptic, the ecliptic being graduated in arc and the equator in time. Within the ring 75 is a ring 76, graduated in longitude to represent the earth and its diurnal rotation, showing universal mean solar time and indicating terrestrial longitude at any point. Within the ring 76 on the face 74 is an annular space 77, graduated in minutes. Within this is a revoluble ring 78, on which are graduations indicating subdivisions of universal mean solar time and longitude. Within this ring 78 is a revoluble ring 79, graduated to indicate subdivisions of sidereal time and longitude. On the same axis with the ring 76 and centrally of the dial is a disk $75^g$, on which are produced lines of latitude and also lines of longitude, radiating from the pole to indicate variations in length of day and night. On the same axis as the ring 75 is a hand 80, indicating on the line of sidereal hours 74 the sidereal hours. On the axis of the ring 76 is a hand 81, indicating the solar hours. On the axis of the ring 78 is a hand 82, indicating on the minute graduations 77 solar minutes, and on the axis of the ring 79 is a hand 83, indicating sidereal minutes. On an independent axis is a diametrical hand 84, indicating the position of the line of the moon's nodes. On another independent axis is a hand 85, extending partly across the dial on the opposite side of its axis, indicating the line of apsides, and also on an independent axis is a hand 86, indicating the moon's place and its motion, both periodic and diurnal. For actuating the various rings and hands just described, the mechanism $6^a$ (shown in Fig. 20) is provided. A central arbor $79^a$ carries the ring 79. This arbor is driven from the shaft 55, connected with the actuating-movement Z by the bevel-gear $79^b$, in mean solar time, to indicate minutes. The ring 78 is carried by a sleeve $78^a$ and the ring 76 is carried by a sleeve $76^a$, these sleeves being supported on the central arbor. Outside of the sleeve $76^a$ is a hollow post 87, extending from the frame $87^a$ of the clock-work. The hand 86 is carried by a sleeve $86^a$ on the post 87, the hand 85 is carried by a sleeve $85^a$, the hand 84 is carried by a sleeve $84^a$, and the ring 75 is carried by a sleeve $75^c$, these sleeves being arranged one upon the other. On the inner end of the sleeve $78^a$ is a pinion $78^b$, which is connected with a pinion $78^d$ on the arbor $79^a$ by the differential gearing $78^c$, by which system of gearing the sleeve $78^a$ and ring 78 are revolved once in a sidereal hour. The inner end of the sleeve $76^a$ is connected with the hub of a series of gear-wheels 90, which wheels with the sleeve $76^a$ and ring 76 are revolved once in a solar day. On the sleeve $78^a$ is journaled the hub of the four properly-spaced different-sized gear-wheels 90, which are for a purpose hereinafter mentioned, and of a gear-wheel 89, which wheel 89 meshes with a pinion $89^a$, integral with a gear $89^b$, meshing with the pinion $76^e$ on the arbor $79^a$, by which connection the gear-wheels 90 are made to revolve once in a solar day. A pinion $91^a$ on a shaft 91 meshes with one of the gear-wheels 90, and a second pinion $91^b$ on the same shaft meshes with a gear-wheel 95 on the sleeve $86^a$, which wheel 90, the pinions on the shaft 91, and the wheel 95 constitute a system of differential gear, by means of which the said sleeve $86^a$ and hand 86 are revolved in such time as to indicate the periodic and diurnal motions of the moon. By two pinions on a shaft 92, meshing, respectively, with one of the wheels 90 and a wheel 96 on the sleeve $85^a$, which system of gearing constitutes a like system of differential gear, the hand 85 is revolved to show the lines of apsides. By two pinions on a shaft 93, meshing, respectively, with one of the wheels 90 and a gear 97 on the sleeve $84^a$ in a like manner, the sleeve $84^a$ and hand 84 are revolved to indicate the positions of the moon's nodes. By two pinions on a shaft 94, meshing, respectively, with one of the wheels 90 and a wheel 98 on the sleeve $75^c$, this sleeve and the double sidereal ring 75 are revolved to indicate, as hereinbefore set forth.

Dial No. 7, Fig. 9, illustrates the elements of lunar and solar cycles and indicates their periods and relations, indicates the line of the moon's nodes, the revolutions of the earth around the sun and of the moon around the earth, and the occurrence of the lunar and solar eclipses, and also gives the phases of the moon as they occur in regular order; also gives the golden number, solar cycle, Sunday letter, and months of the year. This dial consists of a face 99, having produced thereon, near the periphery at 100, the Metonic cycle, with the dates of the occurrence of the full moon and dates of lunar eclipses, within which line is produced a second line 101, containing the number and names of the calendar months in the Metonic cycle. Within this line is a third line 102, containing the dates of the occurrence of the new moons and solar eclipses. Within this line is a line 103 of numbers indicating the golden number, within which is a line 104, indicating the years in the solar cycle and the Sunday letters, and an inner line 105, indicating the calendar months. Centrally of the dial is a representation $105^a$ of the sun, the whole constituting a heliocentric dial. Over this dial revolves a hand 106 once in nineteen years; a hand 107, which revolves once in twenty-eight years, and a hand 108, which revolves once in one year. The hand 108 carries a staff 109, which carries a frame 110, (see Fig. 21,) on which is represented at $110^a$ the earth. In the frame 110 is journaled a staff 111, which carries at its outer end a representation of the moon 112, which staff 111 is provided at its inner end with a bevel-gear $111^a$, meshing with a circular rack $111^b$, fixed on the hand 108. The staff 109 is revolved by gearing, hereinafter described, once in a lunar month, and at the same time, by the gear $111^a$ and rack $111^b$, the staff 111 and moon 112 are revolved once in the same period. The hands above mentioned are driven by a mechanism $7^a$, Fig. 21, now to be described. The hand 108 is carried by an arbor $108^a$, which is driven by a pair of bevel-gears $108^b$ from a shaft 113, driven by a pair of bevel-gears $113^a$ from the arbor $48^a$ of the movement $4^a$, once in one year, or the shaft 113 can be driven from the shaft 55 by an independent system of gearing. The hand 107 is carried by a sleeve $107^a$, and the hand 106 is carried by a sleeve $106^a$. The sleeve $107^a$ is mounted on a hollow post 114, through which passes the arbor $108^a$, and the sleeve $106^a$ is mounted on the sleeve $107^a$. On the arbor $108^a$ is a pinion 115, meshing with a gear 116 on a shaft $116^a$, which carries the pinions $116^b$ and $116^c$. The pinion $116^c$ meshes into a gear $107^b$ on the sleeve $107^a$, and the pinion $116^b$ with a gear $106^c$ on the sleeve $106^a$, these wheels being so proportioned as to give the said sleeves and hands carried thereby the before-mentioned times of revolution. On the post 114 is a circular rack $114^a$. On the hand 108 is a fixed post 117, on which is mounted a pinion $117^a$, meshing with the rack $114^a$, and a gear $117^b$, integral with the pinion $117^a$, meshes with one of a pair of differential gears 118 on the shaft 118$^a$, journaled in the hand 108 and a bracket carried thereby. The second differential gear 118 meshes with a gear 109$^a$ on the shaft 109, by which system of gearing the moon 112 is moved, as hereinbefore described.

Figure 10:
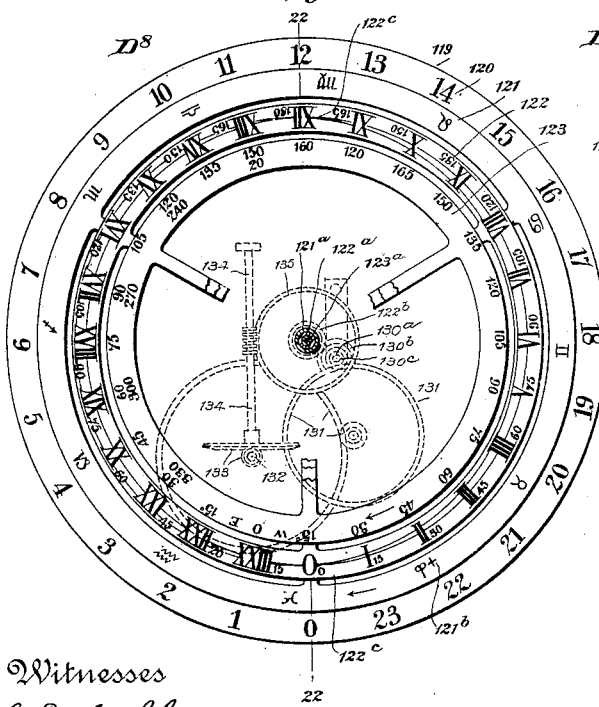

Dial No. 8, Fig. 10, indicates the precession of the equinoxes, the westward movement of the equinoxes in their relation to the fixed stars, and their precedence in coming to the meridian in diurnal indications. This dial consists of a face 119, the periphery of which is graduated at 120 to denote the hours and other time-divisions of a day. Within this line is a revoluble ring 121, on which are produced the signs of the zodiac or the constellations. Within this ring is a second revoluble ring 122, graduated in time and arc, and having marked thereon at 122$^c$ the equinoxes. Within this ring is a third revoluble ring 123, graduated in divisions of terrestrial longitude. On the ring 121 is marked at 121$^b$ the point from which the precession of the equinoxes is definitely reckoned. The ring 123 is fixed on an arbor 123$^a$, (see Fig. 22,) which is revolved once in a solar day. On the shaft 55, connected with the actuating-movement Z, which shaft revolves once in an hour, is a pinion 63$^e$, which engages a pinion 63$^e$ on a shaft 63$^f$, which shaft, by a pair of miter-gears 63$^g$, revolves a shaft 63$^h$, from which shaft 63$^h$, by an ordinary train of clock-gear 63$^d$, the arbor 123$^a$ and ring 123 are revolved once in a solar day. The arbor 123$^a$ carries a gear-wheel 125, which meshes with one of a pair of differential pinions 128, the other of which pinions meshes with a gear-wheel 127 on a short sleeve 127$^a$ on the arbor 123$^a$, by which gearing the sleeve 127$^a$ has its motion accelerated, so that it will revolve once in a sidereal day. On the aforesaid arbor 123$^a$, adjacent to the sleeve 127$^a$, is fixed one side of a frame 129, and within the said frame on the arbor 123$^a$ is a sleeve 122$^a$, which, extending forward through said frame, carries the ring 122. On the sleeve 127$^a$ is a gear 127$^b$, meshing with a gear 130 of the same size on a shaft 130$^a$, journaled in the frame 129, which shaft carries a gear 130$^b$, meshing with the gear 122$^b$ on the sleeve 122$^a$, which gears 130$^b$ and 122$^b$ are of equal size, so that the sleeve 122$^a$, as the frame 129 revolves in a solar day and sleeve 127$^a$ revolves in the same direction in a sidereal day, is caused to revolve in a sidereal day, the shaft 130$^a$ making one revolution on its axis in a year. The ring 121 is carried by a sleeve 121$^a$, which sleeve is carried by its connection through the gearing hereinafter described to the frame 129 to revolve once in a solar day, but is caused to retrograde relatively to its forward motion with the frame 129 by the gearing now to be described, so that it will lose at the rate of one revolution in about twenty-six thousand years. On the shaft 130$^a$ is a pinion 130$^c$, which, by a system of reducing-gear 131, gives motion to a shaft 132. By the difference in movement of the frame 129 and the sleeve 127$^a$, as heretofore explained, the shaft 130$^a$ is caused to revolve once in a year, and by the gearing 131 a pair of bevel-gears 133 on the shaft 132 and on a worm-shaft 134, respectively, which worm-shaft meshes with a worm-wheel 135 on the sleeve 121$^a$, the motion of the shaft 130$^a$ is reduced, so that the sleeve 121$^a$ is retarded relatively to the motion of the sleeve 122$^a$, as hereinbefore set forth.

Rings for indicating solar and sidereal minutes, similar to those shown and described in connection with dial No. 6, with suitable actuating mechanism therefor, may be added to this dial and movement.

Figure 11:
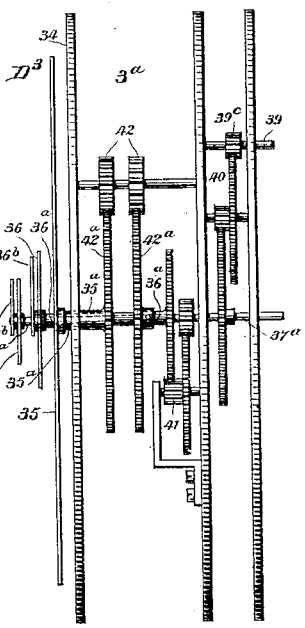

Dial No. 9, Fig. 11, is a heliocentric dial and indicates the diurnal revolutions of the planets of the solar system, their right ascensions and meridian culminations, and rising and setting. It also illustrates the epicycloid motions of the major planets. This dial consists of a face 136, provided at the periphery with a line of numbers 137, indicating the hours of the day. Over the dial is held to revolve within the line 137 of hour-numbers and in a sidereal day a double ring 138, on the outer one of which 138$^a$ are produced the signs of the zodiac and on the inner one 138$^b$ are produced at 138$^d$ equinoctial points and the usual divisions of time and longitude to indicate right ascension and sidereal time. Within this ring is a revoluble ring 139, making a revolution in a mean solar day, which ring is graduated in terrestrial longitude. Within the ring 139 on the dial-face is an annular line of graduations indicating minutes, and within this line may be arranged other revoluble rings, as in dials 1 and 6. Over the face and rings above mentioned revolve eight hands 140, 141, 142, 143, 144, 145, 146, and 147, carrying at their outer ends the representations of the major planets of the solar system, which hands are of a relative length to represent approximately the relative distances of the planets from the sun. By these hands the periodic and diurnal revolutions and right ascension of the planets around the sun are shown. The hand 140 represents Neptune, hand 141 Herschel, hand 142 Saturn, hand 143 Jupiter, hand 144 Mars, hand 145 the Earth, hand 146 Venus, and hand 147 Mercury. The right ascension of the planets is indicated by reckoning from the zero or vernal equinox on the sidereal ring 138$^b$. The diurnal indications of the planets are shown on the hour-line 137, and these rings also indicate the time of day in solar and sidereal times. These rings and hands are actuated by the mechanism now to be described, which in principle and arrangement is similar to the movement No. 8 heretofore described, and consists (see Fig. 23) of a central arbor and sleeves carrying the rings actuated from the arbor, and a series of sleeves and a frame rotated together with the arbor, these latter sleeves connecting within the frame to gearing actuated as hereinafter set forth, whereby they are given a retrograde movement in connection with their daily revolutions, as more particularly described hereinafter. The central or main arbor 148 is driven from the shaft 55 by the reducing-gear 149, shaft 149$^a$, and bevel-gears 149$^b$ on the shafts 149$^a$ and 55 to revolve once in a solar day. Over this arbor 148 are mounted two sleeves. The outer sleeve 138$^c$ carries the outer or sideral ring 138 and the second sleeve 139$^a$ carries the solar ring 139. These two sleeves are mounted on a hollow post 156$^f$, extending from the movement-frame 155. Eight other sleeves, 140$^a$, 141$^a$, 142$^a$, 143$^a$, 144$^a$, 145$^a$, 146$^a$, and 147$^a$, are mounted to turn on the arbor 148 and carry the respective hands 140 to 147. On the sleeves 138$^c$ and 139$^a$ are the gear-wheels 138$^d$ and 139$^b$. On the inner end of arbor 148 is the gear-wheel 148$^a$, meshing with a pinion 150$^a$ on a shaft 150, which shaft carries the differential pinions 151$^a$ and 151$^b$. The pinion 151$^a$ meshes with the gear 138$^d$, and the pinion 151$^b$ with the gear 139$^b$, by which system of gearing the said sleeves and the rings 138 and 139, carried thereby, are revolved, as hereinbefore set forth. On the arbor 148, adjoining the gear 148$^a$, is mounted a sleeve 152, which carries a gear 152$^a$, which meshes with a differential pinion 152$^b$ on the shaft 150. The sleeve 152 also carries a gear-wheel 153. This sleeve and gear 152 and 153 are revolved once in a sidereal day. Adjoining the sleeve 152 is fixed to the arbor 148 a frame 154, which frame and the sleeves 140$^a$ to 147$^a$, held to revolve with the frame 154 by the gearing now to be described, are revolved by and with the said arbor 148. A gear-wheel 155$^a$ on a shaft 155$^b$, journaled in the frame 154, meshes with the gear 153, whereby as the frame 154 revolves once in a solar day and the wheel 153 once in a sidereal day and in the same direction, the shaft 155$^b$ is revolved in a direction contrary to the frame 154 once in a year. The sleeves 140$^a$, 141$^a$, 142$^a$, 143$^a$, 144$^a$, 145$^a$, 146$^a$, and 147$^a$ carry at their inner ends within the frame 154 respectively the gear-wheels 140$^b$ to 147$^b$, of different sizes. The shaft 155$^b$ carries the gear-wheels 156$^a$, 156$^b$ 156$^c$, 156$^d$, and 156$^e$, likewise of different sizes, of which the gear 156$^e$ meshes with the gear 147$^b$, the gear 156$^d$ with the gear 146$^b$, the gear 156$^c$ with the gear 145$^b$, the gear 156$^b$ with the gear 144$^b$, and the gear 156$^a$ with the gear 143$^b$, which gears are so proportioned that the respective planets carried by the hands actuated thereby are retrograded in their daily revolution, so that their correct diurnal meridian culmination is shown for every day, and the said planets in a time equal to their periodic revolutions will arrive again by this movement at the vernal equinox. A gear 156 on the shaft 155$^b$ meshes with a gear 157 on a sleeve 157$^a$, revolving on the sleeve 143$^a$, which gear 157$^a$ meshes with gear 158$^a$ on a shaft 158, located at the opposite side of the frame 154 from the shaft 155$^b$, which gears are so proportioned that the shaft 158 will revolve once in twelve years. On the shaft 158 are the gears 158$^b$, 158$^c$, and 158$^d$. The gear 158$^b$ meshes with the gear 142$^b$, the gear 158$^c$ with the gear 141$^b$, and the gear 158$^d$ with the gear 140$^b$, these gears being so proportioned that the respective planets carried by the hands actuated by said gears will be moved in a manner similar to those before mentioned.

Figure 12:
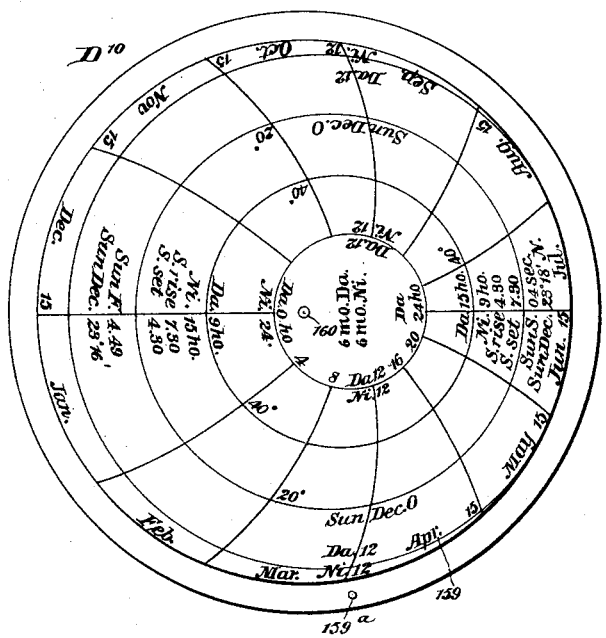

Dial No. 10, Fig. 12, represents a circumpolar hemisphere and shows the obliquity of the earth's axis, the sun's declination, the variations between sun and mean time, and the length of day and night on each latitude at all seasons of the year. This dial consists of a disk 159, which is revolved once a year. At one side of the dial near its periphery is a fixed point. On the disk 159 are projected the lines of latitude and longitude. Near the periphery are produced numerals denoting the months and days of the month, and numerals denoting the variations between sun and mean time. On the face of the disk are numerals denoting the length of the days and nights and time of the sun's rising and setting for all seasons in the various latitudes. At one side of the disk 159 is a fixed point 159$^a$ on the earth's radius vector. This disk is carried on an arbor 160, (see Fig. 24,) which is revolved once a year by a pair of bevel-gears 160$^a$ from a shaft 161, which is revolved by a bevel-gear 161$^a$, which meshes with the bevel-gear 108$^b$ on the arbor 108$^a$ of movement No. 7$^a$, which arbor has a yearly revolution. (See Fig. 2.) In this dial the circumpolar hemisphere may be fixed and the point 159$^a$ be rotated around the same.

Figure 13:
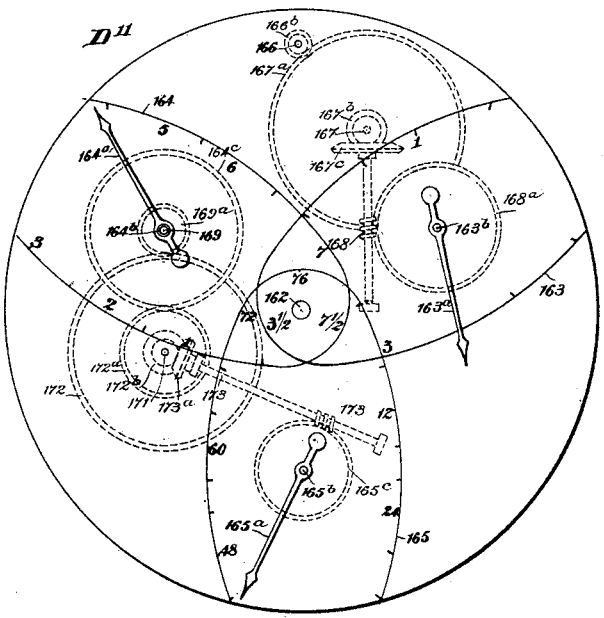

Dial No. 11, Fig. 13, is a heliocentric dial and shows the periods of three of the comets whose periodicity is constant, and which has been computed and verified and their aphelion and perihelion. This dial has produced centrally on its face at 162 a representation of the sun, and also in three ellipses, the periodic time of three comets, the major axes of these ellipses passing a little beyond the sun at the inner end, the ellipse 163 representing the period of Encke's comet, three and one-third years; the ellipse 164, the period of Fay's comet, seven and one-half years; and the ellipse 165 the period of Halley's comet, seventy-six years. Over these ellipses travel hands 163$^a$, 164$^a$, and 165$^a$, respectively, which indicate the position of each comet in its orbit. These hands are carried by arbors 163$^b$ and 165$^b$ and a sleeve 164$^b$, actuated by the mechanism now to be described. From a shaft 124, which is driven from the arbor 123$^a$ of movement 8$^a$ by a pair of bevel-gears 124$^a$, a shaft 166, (see Fig. 25,) journaled in the frame of the movement 11$^a$, is driven by a pair of bevel-gears 166$^a$ to revolve once in a day, from which shaft 166, by the pinion 166$^b$ on said shaft 166, the wheel 107$^a$ on a shaft 167, the bevel-gear 167$^b$ on said shaft 167, the bevel-wheel 167$^c$ on a worm 168, and the worm-wheel 168$^a$ on the arbor 163$^b$, said arbor is revolved once in three and one-third years. The hand 164$^a$ is carried by a sleeve 174$^b$. In this sleeve and the frame is journaled a shaft 169. By a bevel-gear 170$^a$ on a shaft 170, meshing with the bevel-gear 187$^a$ on the shaft 176 of movement 12$^a$, hereinafter described, and a bevel-gear 169$^b$ on shaft 170, meshing with a similar bevel-gear on shaft 169, said shaft 169 is revolved once in a year. On a stud 171 is mounted a gear-wheel 172, which meshes with a pinion 169$^a$ on shaft 169, and a pinion 172$^a$, integral with wheel 172, meshes with a gear-wheel 164$^c$ on sleeve 164$^b$, by which system of gearing the said sleeve 164$^b$ and hand 164$^a$ are revolved once in seven and a half years. By a bevel-gear 172$^b$, integral with pinion 172$^a$ and meshing with a bevel-gear 173$^a$ on a worm-shaft 173, which meshes with a worm-wheel 165$^c$ on arbor 165$^b$, said arbor and the hand 165$^a$ are revolved once in seventy-six years.

Dial No. 12, Fig. 14, indicates the orbital motion of the sun and its dependent planets around a central point and explains the precession of the equinoxes and kindred results of the motion of the solar system among the fixed stars, and also illustrates the orbital motions of the planets around the sun.

The dial 12 consists of a disk 175, centrally of which (see Fig. 26) is a main arbor 176, supporting a frame 177, which revolves over the face of the disk, on the front of which frame, aligning the axis or arbor 176, is marked a point 178, indicating the center around which the sun with the solar system revolves. This frame 177 carries a system of gearing actuated, as hereinafter described, from the arbor 176, which gearing rotates a series of hands similar to the hands 140 to 145 of dial 9, showing the revolutions of the planets around the sun 179, held on a post 180, centrally of a disk 180$^a$, revolving on its axis in the same time as the frame 177 revolves on its axis the arbor 176, the hands being respectively 181 for the Earth, 182 Mars, 183 Jupiter, 184 Saturn, 185 Herschel, and 186 Neptune, these hands and the other revoluble parts being actuated by the mechanism 12$^a$, now to be described. The central arbor 176 is rotated once in a year through the bevel-gear 187$^a$, shaft 187 and bevel-gear 187$^b$ meshing with the gear 160$^a$ on the arbor 160 of mechanism 10$^a$. The arbor 176 extends through the main frame 12$^g$ of the movement and carries a gear-wheel 176$^a$, for a purpose hereinafter set forth. On the arbor 176 is a fixed gear-wheel 176$^b$, having three hundred and sixty-five teeth, which gear meshes with a pinion 188$^a$ on a shaft 188, carrying a second pinion 188$^b$ of the same number of teeth, which pinion 188$^b$ meshes with a gear-wheel 189$^a$, having three hundred and sixty-six teeth and fixed on a sleeve 189 on the arbor 176, which sleeve 189 is rotated once in three hundred and sixty-six days. The sleeve 189 also carries a pinion 189$^b$. Adjacent to the sleeve 189 a frame 190 is fixed to the arbor 176. In practice the gears 176$^b$, 189$^a$, 188$^a$, and 188$^b$ may be differently proportioned to produce the same result. With the pinion 189$^b$ meshes a gear-wheel 191$^a$ on a shaft 191, journaled in the frame 190, whereby, as the sleeve 189 rotates once in three hundred and sixty-six days and the frame 190, carrying the shaft 191, rotates in three hundred and sixty-five days, the pinion 189$^b$ will have a retrograde movement relatively to the frame 190 of one revolution in three hundred and sixty-five years, which movement is imparted to the shaft 191 and reduced by the gear 191$^a$. The shaft 191 carries a pinion 191$^b$, meshing with a gear-wheel 177$^b$ on a sleeve 177$^a$ on the arbor 176, which sleeve carries the frame 177, the said last system of gearing being so proportioned that said frame 177 will be rotated over the disk 175 in a period of twenty-five thousand eight hundred and fifty years, which is about the period of the orbital motion of the sun. On a hollow post fixed on the frame 12$^g$ over the sleeve 177$^a$ is a fixed circular rack 192, for a purpose hereinafter described. On a shaft 193, journaled in the frame 177, is a gear 193$^a$, meshing with the gear 176$^a$ on the arbor 176, whereby the shaft 193 is revolved once in a solar year. The hands 181 to 186, inclusive, are carried by sleeves 181$^a$ to 186$^a$, respectively. On the inner end of the sleeve 181$^a$ is a gear-wheel 181$^b$, which is the same size as and meshes with the wheel 193$^a$. On the inner end of the sleeve 182$^a$ is a wheel 182$^b$, which meshes with a wheel 193$^b$ on the shaft 193, and on the sleeve 183$^a$ is a wheel 183$^b$, which meshes with a pinion 193$^f$ on the shaft 193, which latter two pairs of wheels are so proportioned as to rotate the hands 182 and 183 in the periods of the planets carried thereby. With the pinion 193$^f$ also meshes a wheel 194$^a$, carried by a shaft 194, journaled in a bracket on the frame 177, which shaft also carries a pinion 194$^b$, meshing with a wheel 195$^a$ on a sleeve 195, mounted on the shaft 193, which sleeve carries the three pinions 195$^a$, 195$^b$, and 195$^c$ of which the pinion 195$^c$ meshes with a wheel 184$^b$ on the sleeve 184$^a$, the pinion 195$^b$ with a wheel 185$^b$ on the sleeve 185$^a$, and the pinion 195$^a$ with a wheel 186$^b$ on the sleeve 186$^a$, which pinions and wheels are so proportioned as to revolve the planets carried by the hands 184, 185, and 186 in the periods of said planets. Over the sleeve 186$^a$ projects from the frame 177 a hollow post 196, on which is mounted a short sleeve 197, which carries at its outer end the disk 180$^a$ and at its inner end a gear-wheel 197$^a$, which disk and wheel are shown stayed together. The wheel 197$^a$ meshes with a pinion 198$^a$ on one end of a shaft 198, journaled in the outer end of the frame 177, and a pinion 198$^b$ on the inner end of the shaft 198 meshes with a wheel 199$^a$ on a short sleeve 199, mounted on the post 180, which wheel 199$^a$ meshes with the circular rack 192, hereinbefore mentioned. As the rack 192 and wheels 199$^a$ and 197$^a$ are of equal size, and the pinions 198$^a$ and 198$^b$ are also of an equal size, it follows that the disk 180ª will be rotated in the same time as the frame 177. On the outer end of the post 180 is a fixed rack 200. In the hand 181 is journaled a short arbor 181ᵈ, which carries at its outer end a small globe 181ᵉ, and on the said arbor 181ᵈ is also a gear-wheel 201, which meshes with the rack 200, whereby as the hand 181 is revolved the said arbor 181ᵈ and the globe carried thereby are rotated in the same time— namely, one year. The frame 177, moving over the disk 175, will be so positioned radially from its center of motion that its weight will tend to assist the main clock-movement Z in its action, and it will be seen from the general arrangement of the dial-movements in relation to the starting-point for the power, that as the said movements are farther removed from the actuating-movement the speed required for said movements is gradually decreased.

Instead of deriving the motion of the mechanism which has just been described from the mechanism of dial No. 4, which has been corrected to run in calendar time by the systems of driving mechanism, as set forth, the said movement 12ª may be driven from the shaft 124, connected with the arbor 123ª of movement 8ª, which arbor and shaft revolve once in a mean solar day. On the aforesaid shaft 124 is fixed a bevel gear-wheel 202ª, with which meshes a similar wheel 202ᵇ on a shaft 202, which shaft 202, by a pair of miter-wheels 202ᶜ, gives motion to a shaft 203, journaled in the frame 12ᵍ of movement 12ª, as shown in Figs. 2 and 26. On the shaft 203 is fixed a gear-wheel 204, which engages one of a pair of differential wheels 205 on a shaft 205ª, the other of which differential wheels engages a gear-wheel 206ª on a sleeve 206 on the shaft 203, by which gearing the said sleeve 206 is revolved once in a calendar day. By a pinion 207 on the sleeve 206, which pinion engages a gear-wheel 208 on a shaft 208ª and a miter-wheel 208ᵇ on said shaft 208ª, engaging a miter-wheel 209ª on a worm-shaft 209, the worm of which shaft engages a worm-wheel 210 on the shaft 176, said shaft 176 is revolved once in a calendar day.

In this description the term "graduated," as applied to the rings and annular spaces on the dial-faces, is intended to include those on which signs and other indications appear, as well as those graduated to a scale.

I do not limit myself to the exact details of the driving mechanism as herein described, as the same may be differently arranged and driven without departing from the spirit of my invention.

Having thus described my invention, what I claim as new, and desire to secure by Letters Patent, is—

1. The combination, with the main or master clock and a mean solar and sidereal time mechanism, of a bevel-gear carried by one of the shafts of a clock-train, a worm-shaft, a bevel-gear on said worm-shaft meshing with the bevel-gear on the first shaft, a worm-wheel, and a third shaft carrying said worm-wheel, substantially as set forth.

2. The combination, with a series of dial-faces grouped on a main face, rings and hands revoluble over said faces, and operating mechanisms therefor, of a main clock-movement, and a system of shafting and gearing, substantially as shown and described, connecting the said main movement with the operating movements of the respective dials, substantially as shown and described.

3. The combination, with a main clock, a face on which is produced in annular spaces graduations indicating hours and minutes of sidereal and mean solar time, and circles on which are produced seconds of sidereal and mean time, of hands revoluble over the said annular and circular spaces, and rings carried by a portion of said hands graduated in time and longitude, one of said rings having produced thereon the signs of the zodiac and constellations, substantially as shown and described.

4. The combination, with a main clock, a face on which is produced three circles graduated to indicate time and longitude in hours, minutes, and seconds, respectively, of indicators revoluble over said circles and making, respectively, one, twenty-four, and fourteen hundred and forty revolutions in a year, substantially as shown and described.

5. The combination, with a main or master clock and a face having annular time-graduations, of a revoluble disk having produced thereon a stellar projection, a revoluble ring graduated in longitude and mounted centrally of said disk, an adjustable hand mounted in connection with said ring, a second revoluble ring mounted within the first ring and marked with subdivisions of longitude, substantially as set forth.

6. The combination, with a master-clock and its connecting mechanism, of a shaft moving in mean solar time and a shaft moving in calendar time, and a system of differential gearing connecting said shafts, substantially as shown and described, whereby the difference in said times is compensated for, substantially as set forth.

7. The combination, with a master-clock and its connecting mechanism, of a shaft having a constant motion and a cam-disk on said shaft, an indicating-disk loosely mounted on said shaft, a disk provided with pins connected to said indicating-disk, a lever having a projection riding on said cam-disk, and a pawl pendent from said lever and adapted to engage the pins of the pin-disk, substantially as set forth.

8. The combination, with a master-clock and connecting mechanism and a face having produced annularly thereon hour-numbers, of an arbor having an intermittent motion, three hands held to said arbor, substantially at an angle of forty-five degrees one to another, and two adjustable hands loosely held to said arbor, substantially as and for the purposes set forth.

9. The combination, with a master-clock and connecting mechanism, a shaft having a constant motion, and a gear on said shaft, of a second shaft provided with a gear aligning the gear on the first shaft, and a pinion connecting said gears during a given time only, substantially as set forth.

10. The combination, with a master-clock and connecting mechanism, a shaft having a constant motion, and a gear on said shaft, of a second shaft, a gear on said second shaft in the plane of the first gear, a pinion normally resting in mesh with the second gear and journaled on a rod having a longitudinal motion, and a mechanism for moving said rod and retaining it during a fixed time, substantially as set forth.

11. The combination, with a master-clock and connecting mechanism, a shaft having a constant motion, and a gear on said shaft, of a second shaft, a gear on said shaft, a pendent rod, a pinion journaled on said rod and normally resting on the second gear-wheel, and means for raising said rod and thereby bringing said pinion into mesh with the first gear at a given time, substantially as set forth.

12. The combination, with a master-clock and connecting mechanism, a shaft, a gear thereon, a second shaft, and a gear thereon, of a pinion normally engaging the second gear, a vertical rod to which said pinion is journaled, a segmental track revoluble upon its axis, and a pin on the rod engaging said track, substantially as shown and described.

13. The combination, with a master-clock and connecting mechanism, a gear-wheel, and a second gear-wheel aligning the first gear-wheel, of a pinion, a rod on which said pinion is journaled, an adjustable segmental track, and a roller on the rod engaging the track, substantially as set forth.

14. In combination with a master-clock and connecting mechanism, a segmental track consisting of a fixed radial arm carrying a portion of the track, a radial arm movable upon its axis and carrying a portion of the track, a disk provided with an eccentric-slot pivoted to one arm, and a pin on the other arm engaging said cam-slot, substantially as set forth.

15. The combination, with a master-clock and a connecting mechanism and face having annular graduations indicating the hours of a day and the minutes, of a series of revoluble rings provided with graduations indicating the signs of the zodiac, sidereal time, the equinoxes, equator and ecliptic, terrestrial longitude, mean solar time and longitude, and sidereal time and longitude, a central disk having lines of latitude and longitude, and hands carried on the axes of the various rings, substantially as and for the purposes set forth.

16. In combination with a master-clock and connecting mechanism, a face on which is produced in annular arrangement near the periphery the Metonic cycle with dates of occurrence of full moon and lunar eclipses, within this line the names and numbers of the months in the Metonic cycle, within this line a line containing the dates of the occurrence of new moons and solar eclipses, within this a line of numbers indicating the golden number, within this a line of characters indicating the years of the solar cycle and the Sunday letters, and within this a line indicating the calendar months, substantially as shown and described.

17. In combination with a master-clock and connecting mechanism, a shaft, a frame carried by said shaft, a sleeve on said shaft, a gear-wheel on said sleeve, and differential gearing connecting said shaft and sleeves, a second sleeve within the frame on said shaft, a gear on said sleeve, a shaft journaled in the frame, two gear-wheels on said frame-shaft respectively within and without the frame and meshing, respectively, with the gear on the first sleeve and the gear on the sleeve within the frame, substantially as shown and described, whereby said second sleeve is rotated at the speed of the first sleeve, and the shaft journaled in the frame is rotated at the difference in speed of the first shaft and first sleeve, as set forth.

18. In combination with a master-clock and connecting mechanism, a shaft, a frame on said shaft, a sleeve carrying a gear-wheel on said shaft outside the frame, a sleeve carrying a gear-wheel on said shaft within the frame, a shaft journaled in the frame, and two gear-wheels on said shaft meshing, respectively, with the gears on the two sleeves, substantially as shown and described, whereby the two sleeves rotate in unison, and the shaft journaled in the frame is rotated at the difference in speed of the first shaft and sleeve, as set forth.

19. In combination with a master-clock and connecting mechanism, a shaft, a sleeve on said shaft, a frame on said shaft, a shaft journaled in said frame, and a system of gearing, substantially as shown and described, whereby said frame-shaft is rotated at a speed equal to the difference in speed between the first shaft and sleeve, a sleeve on said first shaft within the frame, and a system of reducing-gear within the frame connecting the frame-shaft and sleeve, substantially as shown and described.

20. In combination with a master-clock and connecting mechanism, a shaft carrying an indicator, a frame on said shaft, a sleeve on said shaft within the frame carrying an indicator, a shaft journaled in the frame and geared to said sleeve, a system of differential gearing connecting said first shaft and frame-shaft, a second sleeve in the frame carrying an indicator, and a system of reducing-gear connecting said frame-shaft and second sleeve, substantially as shown and described, whereby said indicators are revolved at different rates of speed, as set forth.

21. In combination with a master-clock and connecting mechanism, a face, a shaft carrying an indicator in solar time, a sleeve on said shaft carrying an indicator in sidereal time, a second sleeve carrying an indicator which rotates in the orbital period of the sun, and a system of gearing, substantially as shown and described, connecting said shaft and sleeves, whereby the aforesaid motions are given to the indicators, as set forth.

22. In combination with a master-clock and connecting mechanism, a graduated ring and hands carrying representations of the planets revoluble over the same in the times of the apparent diurnal and the periodic motions of the planets, and revoluble graduated rings, whereby at the same time the right ascension of the planets is shown and their epicycloid motion indicated, substantially as set forth.

23. In combination with a master-clock and connecting mechanism, a main arbor, a series of hand-carrying sleeves, ring-carrying sleeves, and a frame on said arbor, all revolving in unison, gearing connecting said arbor and ring-carrying sleeves, differential wheels interposed in said gearing, and a shaft journaled in said frame, gearing connecting said shaft and the main arbor, and said shaft-carrying and hand-carrying sleeves, substantially as shown and described.

24. In combination with a master-clock and connecting mechanism, a face and a fixed point thereon, and a revoluble disk having a circumpolar hemisphere eccentrically produced thereon, substantially as set forth.

25. In combination with a master-clock and connecting mechanism, a dial having produced on its face graduated ellipses indicating the periods of certain comets and provided with hands rotating in the periods of said comets, substantially as shown and described.

26. In combination with a master-clock and connecting mechanism, a dial having produced on its face graduated ellipses inclosing a representation of the sun and intercepting the periphery of the face, and hands revoluble over said ellipses in stated times, substantially as set forth.

27. In combination with a master clock and connecting mechanism, a dial having the periods of certain comets produced on its face and provided with revoluble indicators, substantially as set forth.

28. In combination with a master-clock and connecting mechanism, a face having the period of a comet produced thereon, an arbor carrying an indicator, and a system of reducing-gear connecting said arbor and a shaft of a clock-movement, substantially as shown and described.

29. In combination with a master-clock and connecting mechanism, a face having the period of a comet produced thereon, an arbor carrying an indicator and provided with a worm-wheel, a worm-shaft meshing therewith, and a system of reducing-gear connected with a shaft of a clock-work and with said worm-shaft, substantially as shown and described.

30. In combination with a master-clock and connecting mechanism, a face, a frame revoluble on and around the axis of the face and provided with a face, and hands revoluble in different times over said second face, substantially as set forth.

31. In combination with a master-clock and connecting mechanism, a face, a frame revoluble on and around the axis of the face and provided with a face having produced thereon the signs of the zodiac, and hands revoluble in different times and carrying the signs of the planets, substantially as shown and described.

32. The combination, with a master-clock and connecting mechanism, a face, a hand revoluble over the same carrying a graduated face, and secondary hands revoluble in different times over said second face, of actuating mechanisms for said hand and for said second hands, substantially as shown and described.

33. In combination with a master-clock and connecting mechanism, a face provided with a revoluble hand having a face, and a set of planetary hands revoluble over said second face, a mechanism for revolving said first hand in the period of the solar system, and a mechanism connected to said first mechanism for revolving said planetary hands in the periods of the planets, substantially as set forth.

34. The combination, with a master-clock and connecting mechanism, a face, a fixed post, a rack on said post, and a hand revoluble over said face, of a disk representing the earth revoluble on said hand and provided with gear-teeth engaging said rack, substantially as shown and described.

35. The combination, with a master-clock and connecting mechanism, a face, a central post, a rack on said post, and hands revoluble over said face, of a disk journaled on one of said hands provided with gear-teeth engaging said rack, substantially as shown and described.

36. In combination with a master-clock and connecting mechanism, a dial provided with a revoluble hand having a face over which revolve planetary hands, one of which is provided with a revoluble disk representing the earth, which disk engages a fixed rack carried by a central post, substantially as set forth, whereby the orbital motion of the solar system and the orbital motions of the planets are shown and the parallelism of the earth's axis is preserved during its orbit, as set forth.

37. The combination, with a master-clock and connecting mechanism and a face, of a frame revoluble on and around the face-axis, a revoluble face carried by said frame, hands carried by said frame revoluble over said revoluble face in different times, and an actuating mechanism, substantially as shown and described.

38. The combination, with a master-clock and connecting mechanism, a face, a main arbor, a sleeve on said arbor, differential gear connecting said arbor and sleeve, and a frame fast on said arbor, of a second sleeve on said arbor, a second frame on said sleeve adapted to rotate over said face, and a system of reducing-gear connecting said two sleeves, substantially as shown and described.

39. The combination, with a master-clock and connecting mechanism, a face, a main arbor, a sleeve on said arbor, differential gear connecting said arbor and sleeve, and a frame fast on said sleeve, of a second sleeve on said arbor, a second frame carried by said second sleeve to rotate over said face, a system of reducing-gear connecting said two sleeves, a second face carried by said second frame, indicators rotating over said face, and a system of operating-gearing for said indicators carried by the said second frame and connecting with the main arbor, substantially as shown and described.

40. The combination, with a master-clock and connecting mechanism, a face, a main arbor, a sleeve on said arbor, differential gear connecting said arbor and sleeve, and a frame fast on said sleeve, of a second sleeve on said arbor, a second frame carried by said second sleeve to rotate over said face, a system of reducing-gear connecting said two sleeves, a second face carried by said second frame, indicators rotating over said face, a system of operating-gearing for said indicators carried by said second frame and connecting with the main arbor, a fixed rack, a gear on said second face, and intermediate gearing connecting said face-gear and rack, substantially as shown and described.

41. The combination, with a master-clock and connecting mechanism, a face, a frame revoluble over said face, an operating mechanism, and a fixed rack, of a revoluble face carried by said frame, indicators revoluble over said revoluble face, operating mechanism for said indicators connected with the operating mechanism of the revoluble frame, a gear connected with said revoluble face, and intermediate gearing connecting said face-gear with said rack, substantially as shown and described.

42. The combination, with a master-clock and connecting mechanism, a main arbor, a sleeve on said arbor, and a system of reducing-gearing connecting said arbor and sleeve, of a frame carried by said sleeve, a shaft journaled in said frame, and gearing connecting said shaft and main arbor, a face carried by said frame, a series of sleeves journaled in said frame, indicators carried by said sleeves, and a system of reducing-gearing connecting said shaft and sleeves, substantially as shown and described.

43. The combination, with a master-clock and connecting mechanism, a main arbor, a sleeve on said arbor, and a system of reducing-gearing connecting said arbor and sleeve, of a frame carried by said sleeve, a shaft journaled in said frame, and gearing connecting said shaft and main arbor, a revoluble face carried by said frame, a series of sleeves journaled in said frame, indicators carried by said sleeves, and a system of reducing-gearing connecting said shaft and sleeves, substantially as shown and described.

44. The combination, with a master-clock and connecting mechanism, a main arbor, a sleeve on said arbor, and a system of reducing-gearing connecting said arbor and sleeve, of a frame carried by said sleeve, a shaft journaled in said frame, and gearing connecting said shaft and main arbor, a revoluble face provided with gear-teeth carried by said frame, a series of sleeves journaled in said frame, indicators carried by said sleeves, a system of reducing-gearing connecting said shaft and sleeves, a fixed circular rack eccentric with the main arbor, and intermediate gearing connecting said face-gear and the fixed rack, substantially as shown and described.

45. The combination, with a master-clock and connecting mechanism, a main arbor, a sleeve concentric with said arbor, a fixed circular rack concentric with said sleeve, and an operating mechanism, of a post fixed on said frame, a series of sleeves concentric with said post, hands carried by said sleeves, a system of reducing-gear connecting said sleeves and the main arbor, a face provided with a gear concentric with said sleeves, a gear journaled on the frame-post, meshing with the fixed rack, and gearing connecting said face and the said last-mentioned gear, a fixed rack on said frame-post, and a disk carried by the hand on the inner frame-sleeve and provided with a gear meshing with the said last-mentioned rack, substantially as shown and described.

46. The combination, with a master-clock and connecting mechanism, a face, a fixed post, a series of sleeves concentric with said post, hands carried by said sleeves, and an operating mechanism, of a circular rack on said post, and a revoluble disk carried by one of said hands and provided with teeth meshing with said rack, substantially as shown and described.

47. The combination, with a master-clock and connecting mechanism and a fixed face, of a graduated face revoluble over said fixed face, hands carrying the signs of the planets revoluble over said graduated face, and one of said planetary signs revoluble on its hand, substantially as shown and described.

48. The combination, with a master-clock and connecting mechanism and a face, of a graduated face revoluble over said face in the time of the sun's orbital motion and hands carrying the signs of the planets revoluble over said graduated face in the times of the orbital motions of the planets, substantially as shown and described.

49. The combination, with a master-clock and its connecting mechanism, of an auxiliary clock mechanism having a fixed face, a graduated revoluble face revoluble over said fixed face, indicators moving over said revoluble face, a revoluble disk carried by one of such indicators, substantially as set forth.

50. The combination, with a master-clock and its connecting mechanism, of an auxiliary clock mechanism having an arbor, a series of sleeves concentric therewith, gear-wheels carried by said sleeves, the gear on said arbor, a system of differential gearing connecting the wheels on the sleeves and on the arbor, substantially as described, as set forth.

ABRAHAM M. CORY.

Witnesses:
W. S. WALKER,
SARAH J. WALKER.